US011780312B1

(12) United States Patent
Kaufman (10) Patent No.: US 11,780,312 B1
(45) Date of Patent: Oct. 10, 2023

(54) EXHAUST GAS HEAT RECOVERY FROM CRYO-COMPRESSION ENGINES WITH COGENERATION OF CRYO-WORKING FLUID

(71) Applicant: Jay Stephen Kaufman, Kingston, NH (US)

(72) Inventor: Jay Stephen Kaufman, Kingston, NH (US)

( * ) Notice: Subject to any disclaimer, the term of this patent is extended or adjusted under 35 U.S.C. 154(b) by 0 days.

(21) Appl. No.: 18/087,849

(22) Filed: Dec. 23, 2022

(51) Int. Cl.
*B60K 6/12* (2006.01)
*F25J 1/02* (2006.01)
*F25J 1/00* (2006.01)
*F25B 15/00* (2006.01)

(52) U.S. Cl.
CPC .............. *B60K 6/12* (2013.01); *F25B 15/006* (2013.01); *F25J 1/0012* (2013.01); *F25J 1/0235* (2013.01); *F25J 2260/30* (2013.01)

(58) Field of Classification Search
CPC ......... B60K 6/12; F25B 15/006; F25J 1/0012; F25J 1/0235; F25J 2260/30
USPC .......................................................... 60/655
See application file for complete search history.

(56) References Cited

U.S. PATENT DOCUMENTS

| 4,330,998 | A | * | 5/1982 | Nozawa | F01K 25/10 60/653 |
|---|---|---|---|---|---|
| 4,479,350 | A | * | 10/1984 | Newton | F17C 9/04 60/659 |
| 10,342,890 | B2 | * | 7/2019 | Bray | A61L 15/44 |
| 10,384,926 | B1 | * | 8/2019 | Kaufman | F25J 1/0236 |
| 2020/0056511 | A1 | * | 2/2020 | Conlon | F01K 7/02 |
| 2020/0400372 | A1 | * | 12/2020 | Castellucci | F25J 1/0251 |

* cited by examiner

*Primary Examiner* — Hoang M Nguyen
(74) *Attorney, Agent, or Firm* — McLane Middleton, Professional Association (57) ABSTRACT

The present invention provides an energy recovery, phase change storage and prime mover system with co-generation and cryogenic compression of the working fluid for distributed electric generation and motor vehicle application.

21 Claims, 2 Drawing Sheets

EXHAUST GAS HEAT RECOVERY FROM CRYO-COMPRESSION ENGINES WITH COGENERATION OF CRYO-WORKING FLUID

FIELD OF THE INVENTION

The present invention relates generally to electric generation and motor vehicle prime movers, and specifically to those operating on the temperature differential between a heat source and a cryogenic heat sink. Recovered heat from a high temperature heat source such as a fuel gasifier, solar concentrator, nuclear reactor, fuel cell or combustion engine is further recovered from prime mover exhaust gas to provide power output including co-generation of liquefied air for cryo-compression of the working fluid.

BACKGROUND

Since the 1970's a high efficiency prime mover with renewable energy storage has been a goal of motor vehicle and distributed electric generation design to provide energy independence, conserve fossil fuels, and reduce emission of combustion products. This has led to an increased need for clean and reliable energy storage devices, which can store the power generated, and make it readily available when needed in a wide range of applications. As fossil fuels are consumed more rapidly than they can be produced, an "energy crisis" has emerged and there is a widely recognized need to develop new energy technologies. Moreover, the products of combustion are both unhealthy and dangerous for the environment, while the gradual increase in temperature of the earth's atmosphere, or "greenhouse effect", advises development of energy technology that minimizes the release of heat and greenhouse gases. Some examples of technologies that exploit natural "clean" energy sources include solar photo-voltaic panels, wind turbines, motor vehicle regenerative braking, and fuel cells. Other, yet undeveloped technologies, include structure and motor vehicle draft recovery, advanced refrigerant liquefaction for heat sink cooling, and application of synfuel gasification to production of hydrogen and cryo-sink refrigerant.

Energy storage of solar, wind, and other intermittent sources, has in general, been dominated by advanced batteries. Batteries are resource intensive to manufacture; have a limited number of charge cycles; and present an unprecedented fire hazard. Other storage concepts under development, such as super capacitors, flywheels, and compressed air are too expensive, hazardous and/or inefficient. Renewable fuels, such as compressed hydrogen, liquid natural gas, and bio-fuels are useful for extended unavailability of intermittent energy sources, but are in limited use. Hydrogen is produced inefficiently by electrolysis of water or steam reforming of methane from natural gas, which is available via the environmentally controversial fracking process. Because hydrogen is burned in inefficient converters, on-board vehicle storage is problematic and high pressures must be employed. While carbon from production of synthetic fuels may be captured for sequestration, combustion of these fuels normally discharges carbon dioxide to the atmosphere.

Phase change of liquid air or nitrogen is a promising alternative storage means, for both electric generation and motor vehicles. Specific storage capacity is equal to fuel saved due to cryo-compression per unit weight or volume of refrigerant plus container. The liquid or solidified gas is referred to hereinafter as heat sink refrigerant produced by refrigerant liquefaction. A "liquid nitrogen economy" has been proposed [Kleppe, J. and Schneider, R., "A Nitrogen Economy", ASEE, 1974] and some high pressure engines with phase change storage using cryogenic compression have been tested. These include a fired turbine [Kishimoto, K. et-al, "Development of Generator of Liquid Air Storage Energy System", Mitsubishi Tech. Review Vol. 35-3, 1998] and two fuel-less reciprocating engines [Knowlen, C. et-al, "High Efficiency Energy Conversion Systems for Liquid Nitrogen Automobiles", U. of Washington, SAE 981898, 1998] and [Ordonez, C. et-al, "Cryogenic Heat Engine for Powering Zero Emission Vehicles", ASME Intl. Mech. Engineering Congress & Expo., 2001]. More recently, phase change storage is gaining acceptance in the United Kingdom as indicated by an operating 300 kW pilot plant and a fuel-less liquid nitrogen engine for compact urban vehicles [Center for Low Carbon Futures, "Liquid Air in the Energy and Transport Systems", ISBN: 978-0-9575872-2-9, 2013]. In these prime movers, low compression work is attained by incompressible working fluid. Consumption of refrigerant is excessive in these high pressure engines (40 to 80 bar), which are not optimized, nor supplemented by recovered energy. Two improved cryo-compression engines have been proposed. These are a closed cycle with ambient heat source and quasi-isentropic cryo-compression sink [Ordonez, C., "Liquid Nitrogen Fueled, Closed Brayton Cycle Cryogenic Heat Engine", Energy Conversion & Management 41, 2000], and an open cycle with over ambient heat source and quasi-isothermal cryo-compression sink as disclosed in the inventor's U.S. Pat. No. 7,854,278. Both concepts would economize refrigerant consumption and profoundly impact design and production capacity of refrigerant condensation facilities.

Refrigerant liquefaction to supply early stage cryo-compression engines is primarily by various standard expansion-cooling cycles. These are powered primarily from the electric grid at low cost off-peak time. Inherent disadvantages of this power source include transmission loss, transport of the refrigerant and perpetuation of the environmental downside of centralized fossil fuel and nuclear use. Large central expansion-cooling liquefiers are attaining efficiency of about 50%. This requires complex equipment with features, however, such as pre-cooling, multi-stage expansion and sub-cooling to a lower temperature sink, such as with liquid natural gas during distribution. These features are not economical in smaller distributed applications, leading to higher liquefier power requirements. On-board motor vehicle refrigerant liquefaction is considered to be impractical due to low liquefaction efficiency.

It is important to minimize refrigerant consumption. Moreover, it is recognized that advanced liquefier concepts are required for smaller scale distributed use in conjunction with universally available renewable energy to drive refrigerant liquefaction in both stationary and motor vehicle application. Two promising prior art liquefiers with application to cryo-compression engines are under development. These are magneto-caloric refrigeration, [Matsumoto, K. et al, "Magnetic Refrigerator for Hydrogen Liquefaction, J. of Physics: Conf. Series 150, 2009], and thermo-acoustic refrigeration [Wollan, J. et al, "Development of a Thermoacoustic Natural Gas Liquefier", Los Alamos Natl. Lab., LA-UR-02-1623, AIChE, 2002]. An undeveloped prior art liquefier concept is sub-cooling of an air liquefier by available cryo-liquid from a gasifier, as disclosed in the inventor's U.S. Pat. Nos. 10,343,890 and 10,384,926 for examples, or liquefied natural gas facility during vaporization for distribution. Prior art renewable energy power sources adaptable to refrigerant liquefaction for general use include solar, wind and process heat and pressure recovery. Motor vehicle regenerative braking due to deceleration is a developed technology, potentially supplemented by photovoltaic solar recovery, for on-board liquefaction. Regenerative braking potential is partially lost due to compression heating in reciprocating engines. Solar recovery to motor vehicles is limited by available capture area and photovoltaic panel efficiency. Three undeveloped prior art liquefier power source concepts are energy recovery of wind, motor vehicles, and fuel synthesis for distributed and mobile applications, as disclosed in the inventor's U.S. Pat. Nos. 9,395,118; 7,854,278; and 10,343,890, respectively.

SUMMARY OF INVENTION

There are two main embodiments of the engine of the present invention for distributed electric generation and motor vehicle application. While one of at least ordinary skill in the art will recognize that some features of the main embodiments may be substituted, these are the preferred versions.

The object of the present invention is, therefore, to provide a prime mover (multiple expansion engines) with capability to recover heat and pressure from an originating energy source such as a fuel gasifier, solar concentrator, nuclear reactor, fuel cell or combustion engine to a cascaded arrangement of two or more expansion engines.

It is a further aspect of the present invention to provide a prime mover (multiple expansion engines) with capability to recover pressure from an originating energy source such as the fuel of a fuel cell or combustion engine to a cascaded arrangement of two or more expansion engines.

It is a further aspect of the present invention to provide phase change energy storage by co-generating liquefied air or re-liquefied (less specific energy) air, to cool heat sink working fluid, thus enabling cryo-compression and increasing overall operating temperature difference of a prime mover.

It is a further aspect of the present invention to recover exhaust heat discharging from an expansion engine to cryogenically compressed intake air entering an adjacent expansion engine.

It is a further aspect of the present invention to recover exhaust pressure discharging from a first expansion engine to drive cryo-compression of expansion engine working fluid.

It is a further aspect of the present invention to co-generate production of liquefied air by load shifting between a prime mover and the drive of an air liquefier of a stationary prime mover or a motor vehicle.

It is a further aspect of the present invention to co-generate re-liquefaction of liquefied air used to provide cryo-compression of the working fluid of a prime mover.

These aspects of the invention are not meant to be exclusive and other features, aspects, and advantages of the present invention will be readily apparent to those of ordinary skill in the art when read in conjunction with the following description, accompanying figures and claims.

DETAILED DESCRIPTION

As a preface, it should be noted that all physical components are referred to with an even reference number and all fluid compounds that move amongst the physical components are referred to with an odd reference number. Components with heat exchange properties are depicted as bisected boxes, generally depicting colder pressurized and hotter non-pressurized flow paths. It will be understood from the description that these components gain heat from one fluid and provide heat to another fluid, where the fluids are not likely to mix. Dashed lines indicate an electrical communication between relevant components and do not include reference numbers. This is as opposed to lines between components where an arrow is labeled with a reference number, which indicates a specific fluid and that fluid's direction. In FIG. 2b, cross-hatching indicates mechanical communication between two rotors. When it is noted that a component is disposed between two other components, this disposition indicates the position of the various components on the fluid's path, not necessarily the actual spatial position of the components. Finally, it is noted that when a specific model or distributor of a system component is included, this inclusion is merely exemplary and comparable components may be substituted. In addition, one of at least ordinary skill in the art will recognize that alternate fluids may be substituted.

Figure 1:
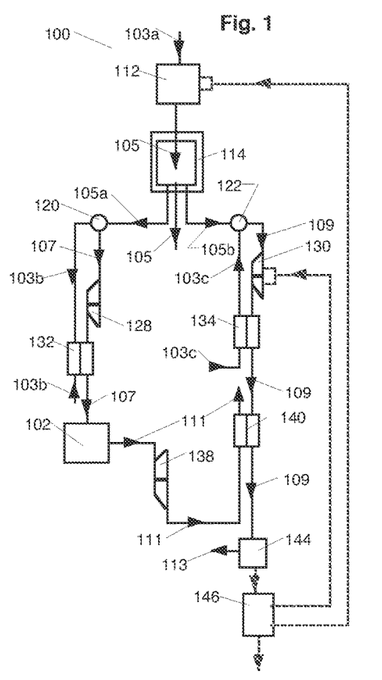
FIG. 1 is a schematic illustrating a basic energy recovery system for recovering energy from the exhaust gas of cryo-compression expansion engines.

Referring first to FIG. 1, a schematic of the most basic form of energy recovery system 100 is provided. Energy recovery system 100 includes an air liquefier 112; dewar 114; first cryo-mixing junction 120; first cryo-recuperator 132; first cryo-compressor 128; second cryo-mixing junction 122; second cryo-recuperator 134; second cryo-compressor 130; at least one energy source 102; engine 138; engine recovery heat exchanger 140; engine driven generator 144; and electric regulator 146. The at least one energy source 102 is preferably one of a fuel gasifier, nuclear reactor, or solar concentrator.

Cryo-recuperators are heat exchangers that recover heat internally from the intake to the discharge flow of an associated cryo-compressor. Cryo-compressors compress a mixture of liquid air and atmospheric air cooled by vaporizing liquid air. Two types of cryo-compressors are discussed herein, a turbine driven cryo-compressor and an electric driven cryo-compressor. Recovery heat exchangers transfer heat between components in external flow paths. Turbines are devices that transform rotational energy from a fluid that is picked up by a rotor system into useable work or energy. As specified herein for various embodiments of system 100, a turbine may be, for example, a turbine-generator or a compressor drive turbine. A generator is a device that converts mechanical energy to electricity and may be, for example, an engine driven generator. An electric regulator, as used herein is a hub through which electricity is directed to various components.

The fluid that moves between the various components of energy recovery system 100 is air. As described below, several modifications of the term "air" will be provided, e.g., liquid air 105, primary air 111, secondary exhaust air 113, and oxygen depleted air due to boil-off or chemical reaction. In addition, letters may be added to a designation to indicate different portions of the same type of air, e.g., first and second portions of liquid air 105a, 105b. It is understood that these various air designations merely distinguish the same basic working fluid in different states (e.g. liquid versus gas) and different production methods (e.g. primary air 107 as a product of mixing liquid air 105a and atmospheric air 103b), or primary exhaust air 111 as a product of primary air 107 through engine 138.

A first portion of atmospheric air 103a is provided to air liquefier 112, which liquefies atmospheric air 103a into liquid air 105. Liquid air 105 is provided to dewar 114. Dewar 114 provides first and second portions of liquid air 105a, 105b to first and second cryo-mixing junctions 120, 122, respectively. Second and third portions of atmospheric air 103b, 103c are provided to first and second cryo-recuperators 132, 134, respectively. The first portion of liquid air 105a and the second portion of atmospheric air 103b are mixed in first cryo-mixing junction 120 to produce primary air 107, which has the temperature of liquid air 105a due to isothermal vaporization. The second portion of liquid air 105b and the third portion of atmospheric air 103c are mixed in second cryo-mixing junction 122 to produce secondary air 109, which has the temperature of liquid air 105b due to isothermal vaporization. Primary air 107 is compressed through first cryo-compressor 128 and provided to energy source 102. Secondary air 109 is compressed through second cryo-compressor 130 and provided to engine recovery heat exchanger 140. It is understood that, as illustrated, the provision of a fluid from one component to another may not always be direct. Primary air 107 may be provided from first cryo-compressor 128 to energy source 102 via first cryo-recuperator 132, for example.

Complimentary flow paths are fed by the cryogenic working fluid. A first fluid flow path begins with the entry of primary air 107 into energy source 102. Primary air 107 recovers heat from the energy source 102, continues on to engine 138 where it expands in the form of primary exhaust air 111; and continues on to engine recovery heat exchanger 140. The second fluid flow path begins with entry of secondary air 109 into engine recovery heat exchanger 140. Secondary air 109 recovers exhaust heat from primary exhaust air 111 in engine recovery heat exchanger 140; and continues on to engine driven generator 144 where it expands. The first and second fluid flow paths compliment and facilitate one another with their fluid heat exchange.

Engine driven generator 144 produces secondary exhaust air 113 and delivers power to electric regulator 146. As discussed below, in system 200, exhaust air 113 is circulated back to a first pre-heater 136 that is one of the at least one energy sources 102 in that embodiment. In FIG. 2b, exhaust air 113 is vented. Heat of secondary exhaust air 113 may be recovered for use, including recovery to an optional third flow path (not shown) fed by cryogenic working fluid and comprising a recovery heat exchanger and engine.

Electric regulator 146 provides power to at least air liquefier 112 and second cryo-compressor 130. As discussed below, in system 200, shown in FIG. 2a, electric regulator 146 also provides power to cryo-compressor 128, which is first electric driven cryo-compressor 156 in that embodiment. In system 300, shown in FIG. 2b, electric regulator 146 also receives power from energy source 102, which is second engine driven generator 170 in that embodiment. It is understood that the short dashed line pointing down and out from electric regulator 146 indicated net power output.

Figure 2A:
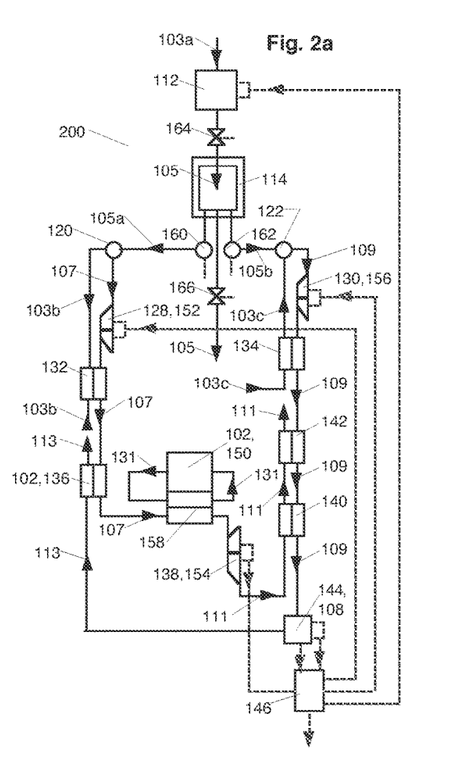
FIG. 2a is a schematic illustrating heat recovery from a sequential arrangement of expansion engines energized by a common heat source.
Figure 2B:
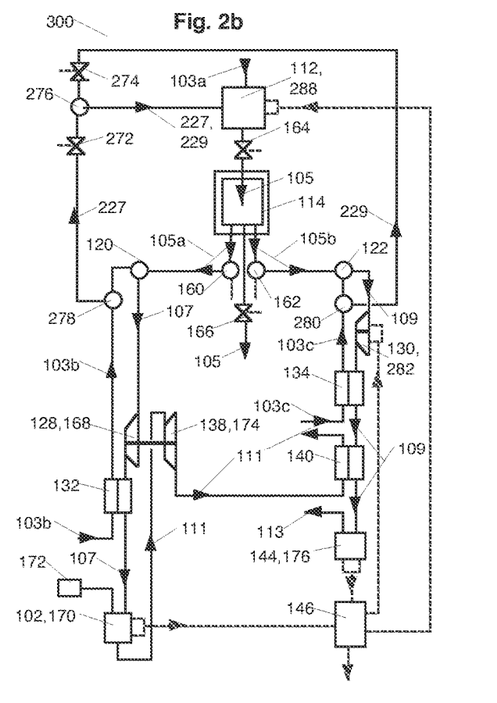
FIG. 2b is a schematic illustrating pressure and heat recovery from a sequential arrangement of expansion engines energized by a common heat source.

Now referring to FIG. 2a, a schematic of a preferred embodiment of the energy recovery system 100 of the present invention is provided. In this embodiment, system 200 is a heat recovery system for recovering energy of end product, exhaust, or circulating coolant from an originating heat source (in this case, primary heat source 150, discussed in more detail below). In system 200, first cryo-compressor 128 is first electric driven cryo-compressor 152. Second cryo-compressor 130 is second electric driven cryo-compressor 156. The engine 138 is first turbine driven generator 154. The engine driven generator 144 is second turbine driven generator 108. (Second turbine driven generator 108 is depicted in FIG. 2a as a rectangle, which is unlike how turbines are usually depicted in the figures herein. This depiction is to show consistency with FIGS. 1 and 2b.) This embodiment also includes a second pre-heater 142 disposed between engine recovery heat exchanger 140 and second cryo-recuperator 134. Electric regulator 146 provides power to first electric driven cryo-compressor 152 in this embodiment.

In system 200 the at least one energy source 102 includes first pre-heater 136 and primary heat source 150. First pre-heater 136 receives primary air 107 from first electric driven cryo-compressor 152 and heats primary air 107. Primary heat source 150 is preferably one of a fuel gasifier, nuclear reactor, or solar concentrator. Primary heat source 150 includes source recovery heat exchanger 158. A coolant 131 circulates between primary heat source 150 and source recovery heat exchanger 158 to transfer heat from source 150 to primary air 107. The coolant 131 may be a circulating exhaust gas, such as a combination of hydrogen, carbon monoxide, carbon dioxide and char of an air blown fuel gasifier, helium of a nuclear reactor, or steam coolant of a solar concentrator, for examples. Secondary exhaust air 113 is provided from second turbine driven generator 108 to first pre-heater 136 and the heat of secondary exhaust air 113 is used to heat primary air 107 therein.

System 200 also includes first and second liquid air pumps 160, 162 that receive first and second portions of liquid air 105a, 105b, respectively. First and second liquid air pumps 160, 162 pump first and second portions of liquid air 105a, 105b to first and second cryo-mixing junctions 120, 122, respectively. First storage valve 164 is disposed between air liquefier 112 and dewar 114 and controls a flow of liquid air 105 there-between. Second storage valve 166 controls a flow of liquid air 105 out of system 100. That is to say, that excess portions of liquid air 105 that are not used in the operation of system 100 may be removed from system 100 to storage (not shown) through second storage valve 166. As noted above, first and second portions of liquid air 105a, 105b, are used in the operation of system 100, which is why they are referenced separately from the liquid air 105 that leaves system 100 through second storage valve 166. Although not shown so as not to overly complicate the illustration, electric regulator 146 may provide power to first and second liquid air pumps 160, 162 and first and second storage valves 164, 166.

A first innovative feature of system 200 is recovery of heat from a high temperature external heat source 150 to energize first turbine driven generator 154 via source recovery heat exchanger 158 followed by recovery of exhaust heat from first turbine driven generator 154 to energize second turbine driven generator 108. First stage heat recovery from primary exhaust air 111 of first turbine driven generator 154 is shown and may be replicated in parallel flow relation by additional cascaded flow paths (not shown) at diminishing temperature. Such optional additional flow paths, fed by cryogenic working fluid, include a recovery heat exchanger and engine.

A second innovative feature is feed of liquid air 105 into first and second electric driven cryo-compressors 152, 156 via regulator 146. The mixture of liquid air 105 and cryo-cooled atmospheric air 103 is a cryogenic heat sink providing least compression work, to increase thermal efficiency of system 200.

In addition, an innovative operational feature, load shifting, provides liquid air 105 for cryo-compression. Relatively constant output at peak efficiency of system 200 is maintained during off-peak electric demand by shifting electric output of first and second turbine driven generators 154, 108 to liquefier 112 via regulator 146, as required. Advantages of load shifting are increased time-average thermal efficiency and reduced thermal transients.

Exemplary design point performance of the cryo-compression prime mover and air liquefier of FIG. 2a is described for recovery of heat from a high temperature [>427° C. (800° F.)] heat source to power an air turbine expansion system. The described turbine-generator arrangement will reduce minimum generating capacity of available micro-turbines from about 25 kWe to 12 kWe. The example is based on the lower end of micro-turbine-generator capacity range (~25 kWe to 500 kWe), in which small units have higher incidence of off-peak operation, and illustrates the effect of the parallel arrangement of the two turbine generators on rotor speed limit, which is inversely proportional to capacity. Micro-turbine-generators are used for distributed generation, however turbine-generators of the present invention also increase the capacity of large central station generators. Two-stage heat recovery is considered, rather than a more complex and higher performance, multi-stage secondary recovery system. Equivalent fuel consumption is reduced, as compared to a fully recuperated turbine driven generator with ambient intake air, due to efficient heat recovery combined with cryo-compression of the working fluid. Estimated thermal efficiency of the cryo-compression air turbine driven generators is 70%, or ~2.5 times as for other advanced recovery cycles. Cryo-compression alone reduces compression work of air turbines to about 14% of total generating capacity, as compared to 55% with ambient intake air. First turbine driven generator operating conditions are; pressure ratio=2.3 at air inlet temperature=838° C. (1540° F.) and rotor speed=100,000 rpm. Second turbine driven generator operating conditions are; pressure ratio=1.5 at air inlet temperature=615° C. (1140° F.) and rotor speed=100,000 rpm. Cryo-compressor inlet air temperature=−173° C. (−280° F.). Sufficient air is liquefied to meet the cryo-compression liquid air requirement of 2.6 kg/kWe (5.7 lb/kWe), based on an estimated specific power requirement of 1100 kJ/kg (475 Btu/lb) of an advanced air liquefier. Load shifting to the liquefier compressor during off-peak electric demand provides relatively constant turbine driven generator output at peak efficiency, in effect, reducing energy required for air liquefaction. In addition, thermal transients of system 100 are reduced.

Now referring to FIG. 2b, a schematic of an alternate preferred embodiment of the energy recovery system 100 of the present invention is provided. System 300 pressurizes atmospheric air 103 and directly recovers energy in the form of pressure and heat from the energy source 102, such as the fuel of a combustion engine or fuel cell. In system 300, electric output for motor vehicle prime mover application is generated via an internal combustion second engine driven generator 170.

In system 300, first cryo-compressor 128 is turbine driven cryo-compressor 168. Second cryo-compressor 130 is third electric driven cryo-compressor 282. (It is understood that this is the sole electric driven cryo-compressor in system 300, but has been designated the "third" so as to avoid confusion with first and second electric driven cryo-compressors 152, 156 in system 200). Engine 138 is compressor drive turbine 174. Engine driven generator 144 is reciprocating engine driven generator 176. Energy source 102 is second engine driven generator 170 with fuel supply 172. (Second engine driven generator 170 is a separate component from engine driven generator 144, which is reciprocating engine driven generator 176 in this embodiment.) Fuel supply 172 is preferably hydrogen.

In system 300, air liquefier 112 is the preferred air re-liquefier 288. Although air re-liquefier 288 is only shown in FIG. 2b, it is understood that air re-liquefier 288 may be used in any embodiment of system 100. Air re-liquefier 288 requires less energy to operate, as it does not have to process sensible heat and only absorbs and rejects the latent heat of the liquefying air to atmosphere. An example of a commercially sold air re-liquefier 288 is that sold under the trademark Cryomech, used for re-liquefying liquid nitrogen, the first stage coolant in production of liquid helium. An example of a commercially sold air liquefier 112 that does not include the additional benefits of air re-liquefier 288 is that sold under the trademark Nikkiso-Cosmodyne.

Unlike in system 200, in system 300, turbine driven cryo-compressor 168 is not powered by electric regulator 146. Instead, turbine driven cryo-compressor 168 and compressor drive turbine 174 are in mechanical communication such that rotations of their respective rotors is synchronized.

Like system 200, system 300 may also include first and second liquid air pumps 160, 162 and first and second storage valves 164, 166 that may be powered by electric regulator 146.

System 300 may include first and second cryo-air extraction junctions 278, 280; first and second liquefier valves 272, 274; and liquefier junction 276. First cryo-air extraction junction 278 is disposed between first cryo-recuperator 132, to which the second portion of atmospheric air 103b is provided, and first cryo-mixing junction 120.

A portion 227 of the second portion of atmospheric air 103b is extracted at first cryo-air extraction junction 278 so that not all of the second portion of atmospheric air 103b is provided to first cryo-mixing junction 120. Second cryo-air extraction junction 280 is disposed between second cryo-recuperator 134, to which a third portion of atmospheric air 103c is provided, and second cryo-mixing junction 122. A portion 229 of the third portion of atmospheric air 103c is extracted at second cryo-air extraction junction 280 so that not all of the third portion of atmospheric air 103c is provided to second cryo-mixing junction 122. First and second cryo-air extraction junctions 278, 280 are in fluid communication with liquefier junction 276. First liquefier valve 272 is disposed between first cryo-extraction junction 278 and liquefier junction 276 and controls a flow of portion 227 that is provided to liquefier junction 276. Second liquefier valve 274 is disposed between second cryo-extraction junction 280 and liquefier junction 276 and controls a flow of portion 229 that is provided to liquefier junction 276. Portions 227, 229 of atmospheric air 103 are provided to air re-liquefier 288 for re-liquefaction. These additional components, first and second cryo-air extraction junctions 278, 280; first and second liquefier valves 272, 274, and liquefier junction 276, are required for extracting and re-liquefying the cryo-air. As such, their inclusion is necessary only when air liquefier 112 is air re-liquefier 288, as discussed above.

Complimentary fluid flow paths are fed by the cryogenic working fluid. A first fluid flow path begins with the entry of primary air 107 into engine driven generator 170, where primary air 107 supports combustion of fuel from fuel supply 172. Primary air 107 is heated and expelled from engine driven generator 170 as primary exhaust air 111; continues on to compressor drive turbine 174 where it expands; continues on to engine recovery heat exchanger 140 in the form of primary exhaust air 111; and is exhausted from engine recovery heat exchanger 140 in the form of primary exhaust air 111. The second fluid flow path begins with entry of secondary air 109 into engine recovery heat exchanger 140. Secondary air 109 recovers exhaust heat from primary exhaust air 111 in engine recovery heat exchanger 140; and continues on to reciprocating engine driven generator 176 where it expands and is exhausted as secondary exhaust air 113. The first and second fluid flow paths compliment and facilitate one another with their fluid heat exchange.

The first innovative feature of system 300 is recovery of engine exhaust gas pressure to drive turbine driven cryo-compressor 168 followed by recovery of exhaust heat from compressor drive turbine 174 via engine recovery heat exchanger 140 to energize reciprocating engine driven generator 176. First stage heat recovery from primary air 111 discharging from compressor drive turbine 174 is shown, which may be replicated in parallel flow relation by additional cascaded flow paths (not shown) at diminishing temperature. Such optional additional flow paths, fed by cryogenic working fluid, would include a pre-heater, recovery heat exchanger and engine.

A second innovative feature is feed of liquid air 105 into cryo-compressors 128, 130 via regulator 146. The mixture of liquid air 105 and cryo-cooled atmospheric air 103 is a cryogenic heat sink providing least compression work, to increase thermal efficiency of system 300.

A third innovative feature is recirculation and extraction of a portion of cryo-working fluid to re-liquefier 288. Re-liquefaction enables rejection to atmosphere of only the latent heat of the extracted air 227 and 229 at saturation temperature of cryo-compression, thus eliminating rejection of sensible heat and reducing the specific energy requirement of liquefaction.

In addition, an innovative operational feature, constant load, combines engine driven generator load and liquefier load to store and dispense liquid air 205 during highway driving. Regenerative braking is sufficient to meet liquid air demand during urban driving. Higher engine driven generator efficiency with constant load operation supports the added re-liquefier power requirement. Advantages of constant load operation are increased time-average thermal efficiency and reduced thermal transients.

Exemplary design point performance of the cryo-compression combustion engine/air re-liquefier of FIG. 2 is described for recovery of heat and pressure from engine exhaust to engine intake air and to a single stage reciprocating engine. Only single stage heat recovery is considered for motor vehicle application, rather than a more complex and higher performance multi-stage recovery system.

Fuel consumption is reduced as compared to a turbocharged internal combustion engine with ambient intake air, due to efficient heat recovery and cryo-compression of the working fluid. Estimated peak liquid air consumption is based on net power output of a 1590 kg (3500 lb) car at highway speed of 120 km/h (75 mph). Equivalent gasoline mileage and liquid air consumption at this speed=18.7 km/L (44 mpg) and 16 lb liquid air/lb $H_2$, respectively. Engine operating conditions are: net power output=30 HP, compression ratio=10, excess air ratio=1.0, exhaust temperature=615° C. (1140° F.) at 6500 rpm and pressure ratio to the turbine driven cryo-compressor=2 at 200,000 rpm. Reciprocating engine operating conditions are: pressure ratio=20 at air inlet temperature=560° C. (1040° F.) at 6500 rpm. Thermal efficiency of the spark ignition engine at 120 km/h (75 mph) is increased from ~25% to ~45% with cryo-compression and exhaust heat recovery. It is estimated that addition of a second recovery flow path would increase overall efficiency to 60%. Sufficient air is re-liquefied to meet the cryo-compression requirement based on regenerative braking in an urban driving cycle. For the highway driving cycle, higher engine driven generator efficiency due to combined load with the re-liquefier, supports the re-liquefier power requirement, while excess liquefied air is held in storage. Re-liquefaction improves the specific power requirement of air from 0.77 kWh/kg (1200 Btu/lb) liquefied to 0.52 kWh/kg (800 Btu/lb) re-liquefied.

Figure 3:
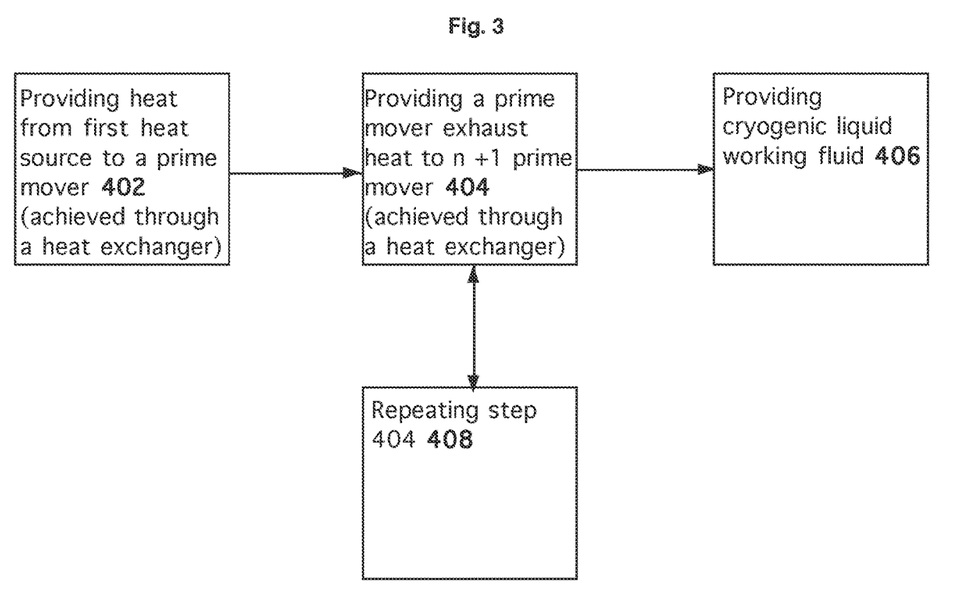
FIG. 3 is a block diagram of the steps of the method of the present invention.

Now referring to FIG. 3, a block diagram illustrating the steps of the method of the present invention are provided. Understanding system 100 and its preferred embodiments of systems 200 and 300, one of at least ordinary skill in the art will recognize that method 400 that is a method for cascaded energy recovery inherent in the operations of these systems. In its most basic form, the steps of method 100 are providing heat generated by a first heat source to an n prime mover 402, wherein the n prime mover generates n prime mover exhaust heat when the heat is provided from the first heat source to the n prime mover; providing the n prime mover exhaust heat to an n+1 prime mover 404, wherein the n+1 prime mover generates n+1 prime mover exhaust heat, and wherein steps 402 and 404 are achieved through fluid flow between the first heat source, the n prime mover, and the n+1 prime mover; and 406 providing cryogenic liquid working fluid to feed the fluid flow, wherein the cryogenic liquid working fluid provides cryogenic compression of working fluid to each of the prime movers. As used in reference to method 400, n=first; n+1=second; n+2=third; etc. . . . . It is preferred that the method also include the step of repeating step 404 until the n prime mover exhaust heat is insufficient to cause the n+1 prime mover to generate n+1 prime mover exhaust heat 408, wherein on each execution of this repeating step, n increases by 1. In other words, exhaust heat from the first prime mover is provided to the second prime mover. Exhaust heat from the second prime mover is provided to the third prime mover. Exhaust heat from the third prime mover is provided to the fourth prime mover, etc. . . . . This continues until the n prime mover cannot provide sufficient heat to the n+1 prime mover for the nth+1 prime mover to generate its own exhaust heat. In this way, the original heat generated by the first heat source is used as fully as possible. As described above, with reference to the systems of the present invention, the first heat source is preferably a fuel gasifier, a nuclear reactor, or a solar concentrator. Also as described above with reference to the systems of the present invention, the prime movers may be: generally, engine 138 and engine driven generator 144 (as shown in FIG. 1) or, specifically first and second turbine driven generators 154, 108 (as shown in FIG. 2a) or compressor drive turbine 174 and reciprocating engine driven generator 176 (as shown in FIG. 2b). Also as described above with reference to the systems of the present invention, the steps of providing heat or exhaust heat are preferably achieved through heat exchangers.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

I claim:

1. An energy recovery system comprising:
an air liquefier that produces liquid air from a first portion of atmospheric air that is at ambient temperature;
a dewar in fluid communication with said air liquefier such that said air liquefier provides the liquid air to said dewar;
a first cryo-recuperator that receives a second portion of atmospheric air;
a first cryo-mixing junction, wherein said first cryo-mixing junction:
is in fluid communication with said dewar such that said dewar provides a first portion of the liquid air to said first cryo-mixing junction;
is in fluid communication with said first cryo-recuperator such that said first cryo-recuperator provides the second portion of the atmospheric air to said first cryo-mixing junction; and
mixes the first portion of the liquid air and the second portion of the ambient air to produce primary air;
a first cryo-compressor in fluid communication with said first cryo-mixing junction such that said first cryo-mixing junction provides the primary air to said first cryo-compressor, wherein said first cryo-compressor compresses the primary air;
at least one energy source in fluid communication with said first cryo-compressor such that said first cryo-compressor provides the primary air to said at least one energy source, wherein said at least one energy source provides heat to the primary air;
an engine through which the heated primary air expands into primary exhaust air;
a first recovery heat exchanger that absorbs heat from the primary exhaust air;
a second cryo-recuperator that receives a third portion of atmospheric air;
a second cryo-mixing junction, wherein said second cryo-mixing junction:
is in fluid communication with said dewar such that said dewar provides a second portion of the liquid air to said second cryo-mixing junction;
is in fluid communication with said second cryo-recuperator such that said second cryo-recuperator provides the third portion of the atmospheric air to said second cryo-mixing junction; and
mixes the second portion of the liquid air and the third portion of the atmospheric air to produce secondary air;
a second cryo-compressor in fluid communication with:
said second cryo-mixing junction such that said second cryo-mixing junction provides the secondary air to said second cryo-compressor, wherein said second cryo-compressor compresses the secondary air; and
said first recovery heat exchanger such that said second cryo-compressor provides the secondary air to said first recovery heat exchanger and the secondary air gains heat absorbed from the primary exhaust air by said first recovery heat exchanger;
an engine driven generator in fluid communication with said first recovery heat exchanger, such that said first recovery heat exchanger provides the secondary air to said generator and wherein said generator produces secondary exhaust air; and
an electric regulator that receives power from at least said generator and provides power to at least said air liquefier and said second cryo-compressor.

2. The energy recovery system as claimed in claim 1, wherein:
said first cryo-compressor is a first electric driven cryo-compressor;
said engine is a first turbine driven generator;
said at least one energy source comprises:
a first pre-heater; and
a primary heat source, wherein:
said first pre-heater is disposed between said first cryo-recuperator and said primary heat source;
said primary heat source is disposed between said first pre-heater and said first turbine driven generator;
said second cryo-compressor is a second electric driven cryo-compressor;
said engine driven generator is a second turbine driven generator in fluid communication with said first pre-heater such that said second turbine driven generator provides the secondary exhaust air to said first pre-heater;
said energy recovery system further comprises a second pre-heater disposed between said engine recovery heat exchanger and said second cryo-recuperator, wherein said second pre-heater exhausts the primary exhaust air.

3. The energy recovery system as claimed in claim 2, wherein said primary heat source comprises a source recovery heat exchanger and heat is passed from said primary heat source to the primary air through said source recovery heat exchanger.

4. The energy recovery system as claimed in claim 1, wherein said at least one energy source is at least a fuel gasifier.

5. The energy recovery system as claimed in claim 1, wherein said at least one energy source is at least a solar concentrator.

6. The energy recovery system as claimed in claim 1, wherein said at least one energy source is at least a nuclear reactor.

7. The energy recovery system as claimed in claim 2, wherein said second turbine driven generator also provides power to said first electric driven cryo-compressor.

8. The energy recovery system as claimed in claim 1, further comprising:
a first storage valve disposed in fluid communication between said air liquefier and said dewar that controls a flow of the liquid air therebetween; and
a second storage valve in fluid communication with said dewar that controls a flow of the liquid air out of said system.

9. The energy recovery system as claimed in claim 1, further comprising:
a first liquid air pump disposed between said dewar and said first cryo-mixing junction; and
a second liquid air pump disposed between said dewar and said second cryo-mixing junction;
wherein said first and second liquid air pumps pump the liquid air from said dewar to said first and second cryo-mixing junctions, respectively.

10. The energy recovery system as claimed in claim 9, wherein said engine driven generator also provides power to said first and second liquid air pumps.

11. The energy recovery system as claimed in claim 1, wherein:
said first cryo-compressor is a turbine drive cryo-compressor;
said at least one energy source comprises a second engine driven generator with a fuel supply;

said engine is a compressor drive turbine;
said second cryo-compressor is a third electric driven cryo-compressor; and
said engine driven generator is a reciprocating engine driven generator.

12. The energy recovery system as claimed in claim 11, wherein said turbine driven cryo-compressor and said compressor drive turbine are in mechanical communication such that a rotation of a rotor of said turbine driven cryo-compressor is synchronized with a rotation of a rotor of said compressor drive turbine.

13. The energy recovery system as claimed in claim 11, wherein said reciprocating engine driven generator exhausts the secondary exhaust air.

14. The energy recovery system as claimed in claim 1, wherein said air liquefier is an air re-liquefier and said energy recovery system further comprises:
   a first cryo-air extraction junction disposed between said first cryo-recuperator and said first cryo-mixing junction;
   a second cryo-air extraction junction disposed between said second cryo-recuperator and said second cryo-mixing junction;
   a liquefier junction;
   a first liquefier valve disposed between said first cryo-air extraction junction and said liquefier junction; and
   a second liquefier valve disposed between said second cryo-air extraction junction and said liquefier junction;
   wherein:
      said first cryo-air extraction junction extracts a portion of the second portion of atmospheric air;
      said second cryo-air extraction junction extracts a portion of the third portion of atmospheric air;
      said first liquefier valve is in fluid communication with said first cryo-air extraction junction and said liquefier junction such that said first liquefier valve controls a flow of the portion of the second portion of atmospheric air from said first cryo-air extraction junction to said liquefier junction;
      said second liquefier valve is in fluid communication with said second cryo-air extraction junction and said liquefier junction such that said second liquefier valve controls a flow of the portion of the third portion of atmospheric air from said second cryo-air extraction junction to said liquefier junction; and
      said liquefier junction is in fluid communication with said air liquefier such that said liquefier junction provides the portions of the second and third portions of the atmospheric air to said liquefier for liquefaction.

15. The energy recovery system as claimed in claim 2, wherein said air liquefier is an air re-liquefier and said energy recovery system further comprises:
   a first cryo-air extraction junction disposed between said first cryo-recuperator and said first cryo-mixing junction;
   a second cryo-air extraction junction disposed between said second cryo-recuperator and said second cryo-mixing junction;
   a liquefier junction;
   a first liquefier valve disposed between said first cryo-air extraction junction and said liquefier junction; and
   a second liquefier valve disposed between said second cryo-air extraction junction and said liquefier junction;
   wherein:
      said first cryo-air extraction junction extracts a portion of the second portion of atmospheric air;
      said second cryo-air extraction junction extracts a portion of the third portion of atmospheric air;
      said first liquefier valve is in fluid communication with said first cryo-air extraction junction and said liquefier junction such that said first liquefier valve controls a flow of the portion of the second portion of atmospheric air from said first cryo-air extraction junction to said liquefier junction;
      said second liquefier valve is in fluid communication with said second cryo-air extraction junction and said liquefier junction such that said second liquefier valve controls a flow of the portion of the third portion of atmospheric air from said second cryo-air extraction junction to said liquefier junction; and
      said liquefier junction is in fluid communication with said air liquefier such that said liquefier junction provides the portions of the second and third portions of the atmospheric air to said liquefier for liquefaction.

16. The energy recovery system as claimed in claim 11, wherein said air liquefier is an air re-liquefier and said energy recovery system further comprises:
   a first cryo-air extraction junction disposed between said first cryo-recuperator and said first cryo-mixing junction;
   a second cryo-air extraction junction disposed between said second cryo-recuperator and said second cryo-mixing junction;
   a liquefier junction;
   a first liquefier valve disposed between said first cryo-air extraction junction and said liquefier junction; and
   a second liquefier valve disposed between said second cryo-air extraction junction and said liquefier junction;
   wherein:
      said first cryo-air extraction junction extracts a portion of the second portion of atmospheric air;
      said second cryo-air extraction junction extracts a portion of the third portion of atmospheric air;
      said first liquefier valve is in fluid communication with said first cryo-air extraction junction and said liquefier junction such that said first liquefier valve controls a flow of the portion of the second portion of atmospheric air from said first cryo-air extraction junction to said liquefier junction;
      said second liquefier valve is in fluid communication with said second cryo-air extraction junction and said liquefier junction such that said second liquefier valve controls a flow of the portion of the third portion of atmospheric air from said second cryo-air extraction junction to said liquefier junction; and
      said liquefier junction is in fluid communication with said air liquefier such that said liquefier junction provides the portions of the second and third portions of the atmospheric air to said liquefier for liquefaction.

17. A method for cascaded energy recovery, said method being performed on an energy recovery system comprising:
   an air liquefier that produces liquid air from a first portion of atmospheric air that is at ambient temperature;
   a dewar in fluid communication with the air liquefier such that the air liquefier provides the liquid air to the dewar;
   a first cryo-recuperator that receives a second portion of atmospheric air;
   a first cryo-mixing junction, wherein the first cryo-mixing junction:

is in fluid communication with the dewar such that the dewar provides a first portion of the liquid air to the first cryo-mixing junction;
is in fluid communication with the first cryo-recuperator such that the first cryo-recuperator provides the second portion of the atmospheric air to the first cryo-mixing junction; and
mixes the first portion of the liquid air and the second portion of the ambient air to produce primary air;
a first cryo-compressor in fluid communication with the first cryo-mixing junction such that the first cryo-mixing junction provides the primary air to the first cryo-compressor, wherein the first cryo-compressor compresses the primary air;
a first heat source in fluid communication with the first cryo-compressor such that the first cryo-compressor provides the primary air to the first heat source, wherein the first heat source provides heat to the primary air;
an n prime mover through which the heated primary air expands into n prime mover exhaust air;
an n prime mover recovery heat exchanger that absorbs n prime mover exhaust heat from the n prime mover exhaust air;
a second cryo-recuperator that receives a third portion of atmospheric air;
a second cryo-mixing junction, wherein the second cryo-mixing junction:
is in fluid communication with the dewar such that the dewar provides a second portion of the liquid air to the second cryo-mixing junction;
is in fluid communication with the second cryo-recuperator such that the second cryo-recuperator provides the third portion of the atmospheric air to the second cryo-mixing junction; and
mixes the second portion of the liquid air and the third portion of the atmospheric air to produce secondary air;
a second cryo-compressor in fluid communication with:
the second cryo-mixing junction such that the second cryo-mixing junction provides the secondary air to the second cryo-compressor, wherein the second cryo-compressor compresses the secondary air; and
the n prime mover recovery heat exchanger such that the second cryo-compressor provides the secondary air to the n prime mover recovery heat exchanger and the secondary air gains heat absorbed from the n prime mover exhaust air by the n prime mover recovery heat exchanger;
an n+1 prime mover in fluid communication with the n prime mover recovery heat exchanger, such that the n prime mover recovery heat exchanger provides the secondary air to the n+1 prime mover and wherein the n+1 prime mover produces n+1 prime mover exhaust air; and
an electric regulator that receives power from at least the n+1 prime mover and provides power to at least the air liquefier and the second cryo-compressor, said method comprising the steps of:
a) providing heat generated by the first heat source to the n prime mover, wherein the n prime mover generates n prime mover exhaust heat when the heat is provided from the first heat source to the n prime mover;
b) providing the n prime mover exhaust heat to the n+1 prime mover, wherein the n+1 prime mover generates n+1 prime mover exhaust heat, and wherein said steps a) and b) are achieved through fluid flow between the first heat source, the n prime mover, and the n+1 prime mover;
providing cryogenic liquid working fluid to feed the fluid flow, wherein the cryogenic liquid working fluid provides cryogenic compression of working fluid to each of the prime movers.

18. The method as claimed in claim 17, further comprising the step of repeating said step b) until the n prime mover exhaust heat is insufficient to cause the n+1 prime mover to generate n+1 prime mover exhaust heat, wherein on each execution of said step of repeating, n increases by 1.

19. The method as claimed in claim 17, wherein the first heat source is one of a group consisting of a fuel gasifier, a nuclear reactor, and a solar concentrator.

20. The method as claimed in claim 17, wherein said step of providing heat generated by the first heat source to the n prime mover is achieved through a heat exchanger.

21. The method as claimed in claim 17, wherein said step of providing the n prime mover exhaust heat to the n+1 prime mover is achieved through a heat exchanger.

* * * * *